United States Patent
Lemieux

[15] 3,693,480
[45] Sept. 26, 1972

[54] COMPOUND FLUID PRESSURE ACTUATOR FOR FRICTION TORQUE COUPLINGS

[72] Inventor: George E. Lemieux, Livonia, Mich.
[73] Assignee: Ford Motor Company, Dearborn, Mich.
[22] Filed: May 27, 1971
[21] Appl. No.: 147,549

[52] U.S. Cl. ................................................. 74/789
[51] Int. Cl. ............................................... F16h 3/44
[58] Field of Search ........................... 74/789; 91/27

[56] References Cited

UNITED STATES PATENTS

| | | | |
|---|---|---|---|
| 2,806,388 | 9/1957 | Simpson | 74/789 |
| 3,004,390 | 10/1961 | Duffy | 91/27 |
| 3,352,166 | 11/1967 | Marquart et al. | 74/789 |

Primary Examiner—C. J. Husar
Attorney—John R. Faulkner and Donald J. Harrington

[57] ABSTRACT

A fluid pressure operated friction disc coupling comprising a multiple disc assembly adapted to transfer friction torque when it is frictionally engaged, an annular cylinder and a compound annular piston received in the cylinder, said piston including a small annular piston portion engagable with the disc assembly and a larger annular piston portion registering with the smaller piston, said piston portions cooperating with the annular cylinder to define a common pressure chamber whereby initial actuation of the small piston portion upon distribution of pressure to the pressure cavity is cushioned prior to full engagement.

7 Claims, 2 Drawing Figures

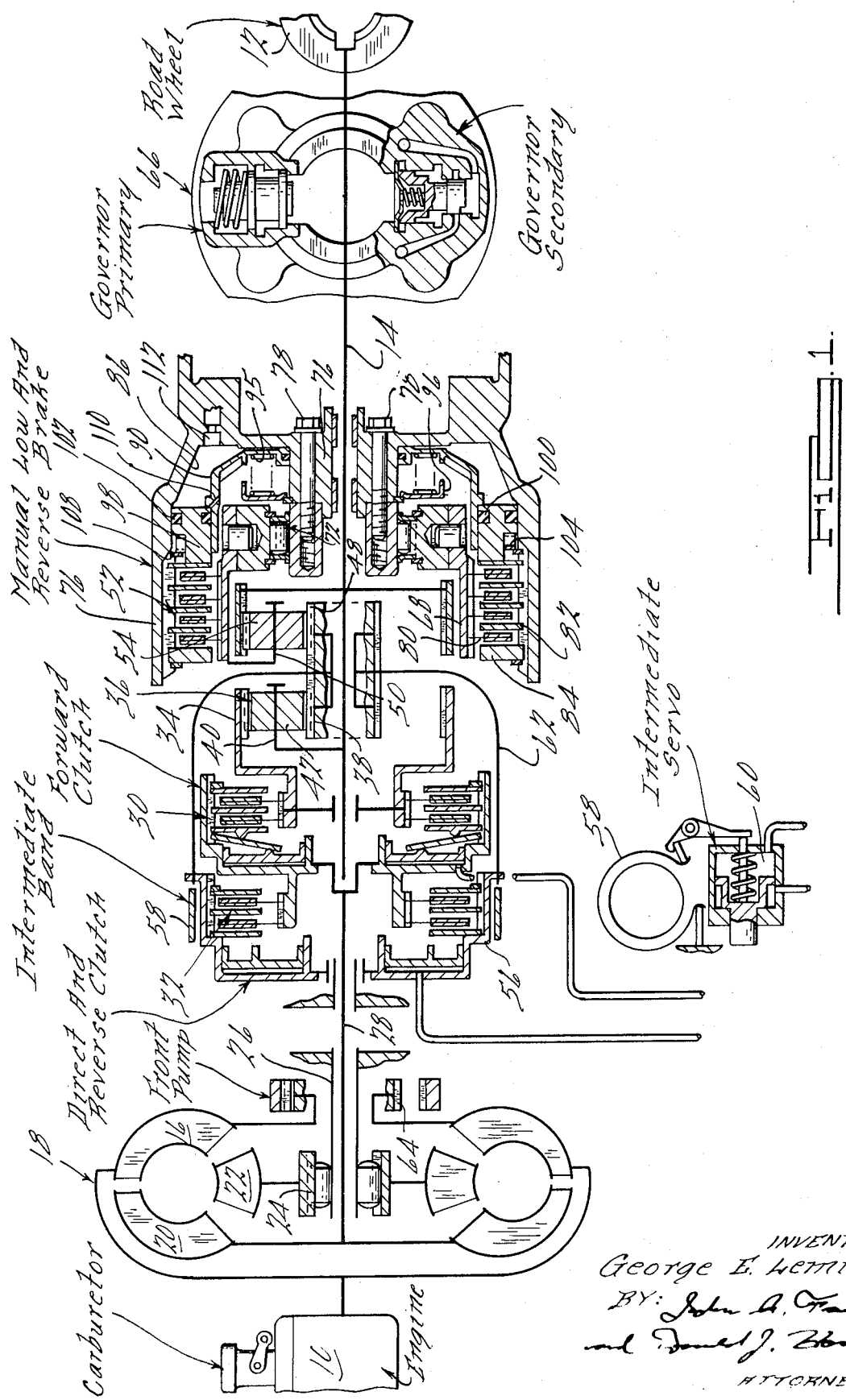

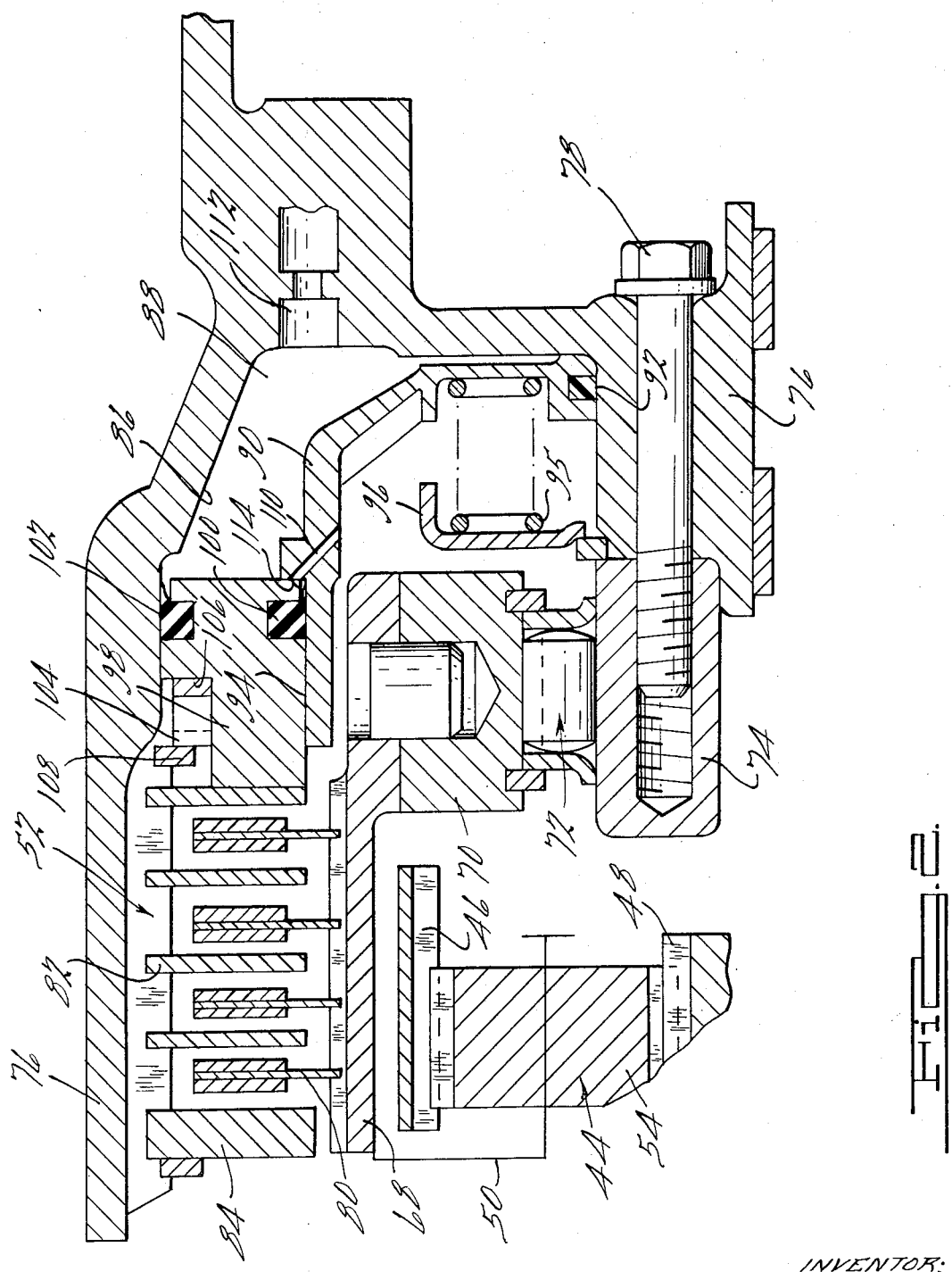

3,693,480

COMPOUND FLUID PRESSURE ACTUATOR FOR FRICTION TORQUE COUPLINGS

GENERAL DESCRIPTION OF THE INVENTION

My invention is adapted especially to be used as a reaction brake in a geared planetary transmission mechanism. A typical environment for my invention would be a three-speed ratio automatic power transmission mechanism for automotive vehicles.

The transmission mechanism described here includes a hydrokinetic torque converter having a bladed impeller driven by an internal combustion engine for an automotive vehicle. The converter includes also a bladed turbine and a bladed stator situated in toroidal fluid flow relationship with respect to the impeller. The turbine is connected to torque input elements of a three-speed ratio planetary gear system. The output portion of the gear system is connected to a transmission tailshaft, which in turn is connected to the vehicle traction wheels through a driveshaft and a differential-and-axle assembly.

The reaction element for the gear system is adapted to be anchored by the improved disc brake of my invention. When the brake is applied, the mechanism is adapted for operation in an underdrive ratio.

In certain prior art mechanisms the engagement of an underdrive speed ratio band brake is accompanied by an undesirable harshness due to the sudden application of friction braking torque. Attempts have been made to cushion the engagement of the friction brake bands in environments of this type, one arrangement being shown in Duffy U.S. Pat. No. 3,004,390, which is assigned to the assignee of my instant invention, and another arrangement is shown in U.S. Pat. No. 2,633,712. My present invention is capable of establishing a cushioning action in a friction disc brake, as distinguished from a band brake, and it provides an accumulator action following initial cushioned engagement of the friction discs as the mechanism is conditioned for underdrive operation. The cushioning action that occurs during initial braking engagement provides a reduced or modified torque capacity. This is followed by stroking of the main piston portion of the mechanism. As an accumulating action takes place, the portion of the compound piston structure that establishes the initial braking engagement cooperates with the main piston portion to define a common working chamber. As the main piston portion moves with respect to the smaller piston portion, an accumulator action takes place because of the compression of a piston spring acting on the main piston portion.

After the main piston portion moves relative to the smaller piston portion to its limiting position, the brake servo pressure rises to its maximum value, thereby establishing full braking action. At that instant motion of the reaction element relative to the stationary transmission housing will approach zero angular velocity.

Timing orifices may be formed in the main piston portion. The size of the orifices, as well as the characteristics of the spring acting on the main piston portion, may be varied to suit particular design characteristics.

BRIEF DESCRIPTION OF THE FIGURES OF THE DRAWING

FIG. 1 shows in schematic form a complete view of a planetary power transmission mechanism embodying the improved compound brake of my invention;

FIG. 2 is an enlarged cross-sectional view of the compound brake used for obtaining a low speed ratio reaction in the transmission mechanism of FIG. 1.

PARTICULAR DESCRIPTION OF THE INVENTION

Numeral 10 designates an internal combustion engine in an automotive vehicle driveline. Numeral 12 designates the vehicle traction wheels which are connected through a suitable differential-and-axle mechanism to a driveshaft which is connected in turn to the driven shaft 14 of the transmission. The crankshaft of engine 10 is connected to impeller 16 of hydrokinetic torque converter 18. Impeller 16 includes a shell which encloses the bladed members of the converter, the latter comprising impeller 16, turbine 20 and stator 22. The bladed converter members are arranged in toroidal fluid flow relationship in the usual fashion. Stator 22 is adapted to rotate in the direction of rotation of the impeller, but it is braked against rotation in the opposite direction by overrunning brake 24 supported by stationary stator sleeve shaft 26.

Bladed turbine 20 is connected drivably of the gear unit 36. Planet pinions 42 journalled on the carrier 40 mesh with sun 28. Shaft 28 is connected to the torque input side of forward clutch 30 and direct-and-reverse clutch 32. The torque output side of clutch 30 is connected to ring gear 34 of a simple planetary gear unit 36. The torque output side of clutch 32 is connected to sun gear 38 of the planetary gear unit 36. Driven shaft 14 is connected drivably to the carrier 40 mesh with sun gear 38 and ring gear 34.

A second simple planetary gear unit 44 includes ring gear 46 connected to power output shaft 14. It includes also sun gear 48, which is formed integrally with sun gear 38. Carrier 50 of the gear unit 44 is adapted to be braked by a friction disc brake 52 which will be described with reference to FIG. 2. Pinions 54 are journalled on the carrier 50 and mesh with ring gear 46 and sun gear 48.

The torque output side of the clutch 32 comprises a brake drum 56 about which is positioned friction brake band 58. The drum 56 can be anchored by the band 58 as the latter is actuated by fluid pressure operated servo 60, thereby providing a torque reaction point during intermediate speed ratio operation. Drum 56 is connected to the common sun gears 38 and 48 by a drive shell 62.

Clutches 32 and 30 and the brake 52 are actuated by fluid pressure operated servos comprising an annular cylinder and an annular piston which cooperate to define working pressure chambers. Pressurized fluid is distributed selectively to the chambers through a control system which is supplied with circuit pressure by means of a positive displacement pump 64 drivably connected to the impeller 16. A driven speed signal for the control system is provided by primary and secondary governor valves which form a part of a governor assembly 66 connected to the power output shaft 14.

The carrier 50 is connected to externally splined brake element 68 which forms a part of the brake 52. It carries outer race 70 of an overrunning brake generally indicated at 72. The inner race 74 for the brake 72 is connected directly to the transmission housing 76 by means of bolts 78.

Overrunning brake elements, such as rollers, are situated between races 70 and 74. Race 74 is cammed to provide a separate cam surface for each roller, thereby establishing a one-way braking action for carrier 50.

During operation in the forward driving speed ratios, clutch 50 is applied. Overrunning brake 72 acts as a reaction point for the mechanism during operation in the lowest forward driving speed ratios.

Torque delivered through the clutch 30 during low speed forward-drive operation is distributed to the ring gear 34. Since the carrier 40 is connected to the driven shaft, sun gear 38 is driven in a reverse direction as positive forward driving torque is distributed through the carrier to the shaft 14. The negative torque and the sun gear 38 and the companion sun gear 48 causes a forward driving torque on ring gear 46 as the carrier 50 serves as a reaction member.

Intermediate speed ratio operation is achieved by engaging brake band 58. This anchors sun gear 38. Overrunning brake 72 now freewheels as torque is distributed through the gear unit 36.

Direct-drive operation is achieved by engaging simultaneously both clutches and releasing the brake 58. All of the elements of the gear units now are rotated in unison, thus establishing a 1:1 gear ratio.

Manual-low operation is obtained by engaging brake 52 so it, rather than overrunning brake 72, will serve as a reaction brake. Brake 52 also is engaged during reverse drive operation.

During reverse drive operation, clutch 32 is applied and clutch 30 is released. Torque from the driven shaft 28 then is distributed directly to the sun gear 48. With the carrier 50 acting as a reaction member, ring gear 46 and power output shaft 14 are driven in a reverse direction.

The brake 52 includes internally splined brake discs 80. These are arranged in adjacent, alternating relationship with respect to externally splined brake discs 82 which are secured to the housing 76. A reaction ring 84 is carried by the housing to provide for distribution of reaction thrust forces to the housing 76 when the brake discs are engaged.

The housing defines an annular cylinder 86. A compound piston received within the cylinder 86 cooperates with the housing to define a pressure chamber 88. The compound piston includes a radially inward piston portion 90 having an inner sealing margin 92 and an outer sealing margin 94. Piston portion 90 is engaged by springs 95 which are seated on plate 96. The secondary piston portion 98 slidably registers with the sealing periphery 94 of the piston portion 90. A fluid seal 100 is situated between the sealing surfaces of the ring 98 of the piston portion 90. A sealing ring 102 is carried by the outer margin of the piston portion 98 sealingly engaging the surrounding wall of the cylinder 86.

A circular wave spring 104 is positioned between the shoulder 106 on the piston portion 98 and a snap ring 108 is secured to the inner margin of the housing 76.

A flow restricting fluid passage 110 extends from the working chamber 88 to the exhaust region occupied by the springs 94, thereby providing a controlled rate of engagement of the brake upon distribution of pressure to the chamber 88.

During the beginning of the engagement cycle, fluid pressure is distributed to the chamber 88 through a pressure distributor passage 112, which communicates with the control system. The initail build-up of pressure causes displacement of the piston portion 98 with respect to the piston portion 90 against the opposing influence of the wave spring 104. This causes initial application of the friction discs of the brake 52. After a predetermined pressure build-up occurs in the chamber 88, the piston 90 begins to move against the opposing force of springs 95. Continuing motion of the piston portion 90 will cause a progressive increase in the pressure in the chamber 88 which in turn results in a progressively increasing force on the discs 82. The rate of pressure build-up can be controlled by calibration of the orifice 110.

When the piston portion 90 reaches its limiting position, shoulder 114 on the outer margin of piston portion 90 engages piston portion 98. When piston portion 90 reaches its limiting position, passage 110 becomes sealed against piston portion 98. When piston portion 98 is so engaged, the pressure in chamber 88 immediately increases to its maximum value.

The additional engagement of the brake is characterized by an accumulating action, the magnitude of which depends upon the calibration of the spring 94 and the orifice 110. Fluid flow through orifice 110 is interrupted after the brake becomes fully applied thereby avoiding unnecessary leakage of pressurized fluid supplied by the pump 64. The timing of the brake application can be controlled also by providing suitable control orifices or flow scheduling devices in the fluid pressure distributor passages designated by reference character 112.

Having thus described a preferred embodiment of my invention, what I claim and desire to secure by U.S. Letters Patent is:

1. A friction torque establishing device having two relatively movable torque distributing elements, a first set of friction discs connected to one element, a second set of friction discs connected to the other element, said friction discs being situated in adjacent, alternating relationship, an annular cylinder forming in part said other element, a compound annular piston situated in said cylinder and defining therewith a pressure chamber, the geometric axis of said cylinder and piston coinciding with the axis of said torque distributing members, said compound piston comprising a first circular member having an inner periphery and an outer periphery, the inner periphery being arranged in sealing engagement with said annular cylinder, a second circular outer piston member surrounding the outer periphery of the first piston member and sealingly engaging said other clutch element, said second piston member being movable axially with respect to said first piston member under the influence of pressure forces due to pressure in said chamber, portions of said first piston member being adapted to engage said friction discs, means for limiting the relative displacement of said first piston member relative to said second piston member and spring means acting on said first piston member for opposing forces due to pressure in said chamber.

2. The combination as set forth in claim 1 wherein said friction torque establishing device is a friction brake, a stationary housing defining in part said other friction element, said housing cooperating with said compound piston to define said working chamber, and a fluid flow restricting orifice extending between said chamber and the low pressure side of said first piston member.

3. The combination as set forth in claim 1 wherein said orifice communicates with the outer periphery of said first piston member adjacent said circular piston member whereby said circular piston member seals said orifice when said first piston member advances to its limiting position relative to said circular piston member upon frictional engagement of said discs.

4. The combination as set forth in claim 2 wherein said device includes a secondary spring means acting on said circular piston member to produce an axial force that opposes the force of the pressure in said chamber, the spring rate for said secondary spring means being substantially less than the spring rate for the spring means acting on said first piston portion.

5. The combination as set forth in claim 3 wherein said device includes a secondary spring means acting on said circular piston member to produce an axial force that opposes the force of the pressure in said chamber, the spring rate for said secondary spring means being substantially less than the spring rate for the spring means acting on said first piston portion.

6. In a torque delivery gearing assembly having planetary gear elements, a driving member connected to a torque input gearing element, a driven member connected to a torque output gearing element, friction brake means for anchoring a reaction element of said gearing thereby establishing an underdrive speed ratio as torque is distributed from said driving member to said driven member, a stationary transmission housing enclosing said gearing, said brake means comprising first brake discs carried by said housing, second brake discs registering with said first brake discs and being connected to said reaction element, an annular cylinder defined by said housing, a compound piston in said cylinder and cooperating therewith to define a pressure chamber, said compound piston comprising a first annular piston portion slidably registering with said housing at its radially inward margin, a second circular piston portion slidably situated on the outer peripheral margin of said first piston portion, the radially outward surface of said second piston portion slidably engaging said housing, said second piston portion being adapted to move relative to said first piston portion into engagement with said discs as pressure is applied to said chamber, and spring means acting on said first piston portion for opposing the force of the pressure in said chamber whereby an initial brake engagement is accomplished prior to application of full braking pressure on said compound piston.

7. The combination as set forth in claim 6 wherein said compound piston comprises a flow restricting orifice in said first piston portion connecting said chamber to an exhaust region whereby the rate of engagement of said brake may be controlled by appropriately calibrating the orifice and said spring means and means for limiting the motion of said first piston portion relative to the said second piston portion upon brake application.

* * * * *

UNITED STATES PATENT AND TRADEMARK OFFICE
CERTIFICATE OF CORRECTION

PATENT NO. : 3,693,480
DATED : September 26, 1972
INVENTOR(S) : George E. Lemieux It is certified that error appears in the above—identified patent and that said Letters Patent are hereby corrected as shown below:

In column 3, line 62, change "94" to -- 95 --.

In column 4, line 22, change "additional" to

--initial --.

In column 4, line 24, change "94" to -- 95--.

In column 4, line 56, change "first" to -- second--.

In column 4, line 67, change "working" to -- pressure --.

In column 5, line 4, change "1" to -- 2 --.

In column 5, line 6, before "circular" add -- second --.

In column 5, line 7, before "circular" add -- second --.

In column 5, line 9, before "circular" add -- second --.

In column 5, line 13, before "circular" add -- second --.

UNITED STATES PATENT AND TRADEMARK OFFICE
CERTIFICATE OF CORRECTION

PATENT NO. : 3,693,480

DATED : September 26, 1972

INVENTOR(S) : George E. Lemieux

It is certified that error appears in the above-identified patent and that said Letters Patent are hereby corrected as shown below:

In column 5, line 17, change "portion" to -- member --.

In column 5, line 20, before "circular" add -- second --.

In column 5, line 24, change "portion" to -- member --.

Signed and Sealed this

Fifth Day of October 1982

[SEAL]

Attest:

Attesting Officer

GERALD J. MOSSINGHOFF

Commissioner of Patents and Trademarks